(12) United States Patent
Laird et al.

(10) Patent No.: US 6,273,025 B1
(45) Date of Patent: Aug. 14, 2001

(54) AQUARIUM WATER CIRCULATION SYSTEM

(76) Inventors: Joseph D. Laird, 5483 Forest Dr., Loganville, GA (US) 30052; Michael J. Resnick, 2111 Strasburg Ct., Atlanta, GA (US) 30368

( * ) Notice: Subject to any disclaimer, the term of this patent is extended or adjusted under 35 U.S.C. 154(b) by 0 days.

(21) Appl. No.: 09/394,389

(22) Filed: Sep. 9, 1999

(51) Int. Cl.$^7$ .................... A01K 63/04; A01K 63/00
(52) U.S. Cl. ................................ 119/245; 119/254
(58) Field of Search .................... 119/245, 253, 119/259, 254, 246, 248; 137/563; A01K 63/00, 63/04

(56) References Cited

U.S. PATENT DOCUMENTS

| | | | |
|---|---|---|---|
| 3,638,795 | * 2/1972 | Feddern et al. | 210/169 |
| 3,929,101 | * 12/1975 | Katz | 119/260 |
| 3,971,338 | * 7/1976 | Alexson | 119/262 |
| 4,302,273 | * 11/1981 | Howard, Jr. | 156/345 |
| 4,954,052 | * 9/1990 | Simmons | 417/331 |
| 5,467,739 | * 11/1995 | Boschert | 119/247 |
| 5,535,702 | * 7/1996 | Idbeis | 119/247 |
| 5,732,657 | * 3/1998 | Idbeis | 119/257 |
| 5,782,204 | * 7/1998 | Rahn | 119/255 |

FOREIGN PATENT DOCUMENTS

| | | | |
|---|---|---|---|
| 594159 | * 4/1994 | (EP) | A01G/31/02 |
| 62258011 | * 4/1992 | (JP) | 40/406 |
| 8154534 | * 6/1996 | (JP) | A01K/63/04 |
| 9300800 | * 1/1993 | (WO) | A01K/63/00 |
| 9941980 | * 8/1999 | (WO) | A01K/63/00 |

* cited by examiner

*Primary Examiner*—Peter M. Poon
*Assistant Examiner*—Son T. Nguyen
(74) *Attorney, Agent, or Firm*—Michael S. Neustel

(57) ABSTRACT

An aquarium water circulation system for providing improved water circulation to a saltwater aquarium by simulating a natural wave motion. The inventive device includes a container having an interior portion, a plurality of upper slots within the container, a plurality of lower slots within the container, a shaft having a first threading and a second threading, a plunger member threadably attached about the shaft and slidably positioned within the container, and a motor mechanically connected to the shaft for rotating the shaft. As the plunger member is forced downwardly, the water within the container is forced out from the lower slots and into the upper slots. When the plunger member is forced upwardly, the water within the container is forced out from the upper slots and into the lower slots simulating wave motions.

18 Claims, 5 Drawing Sheets

AQUARIUM WATER CIRCULATION SYSTEM

BACKGROUND OF THE INVENTION

1. Field of the Invention

The present invention relates generally to aquarium pumps and more specifically it relates to an aquarium water circulation system for providing improved water circulation to a saltwater aquarium by simulating a natural wave motion.

2. Description of the Prior Art

Aquarium water pumps have been in use for years. Typically, a conventional water pump for saltwater aquariums comprises a plurality of pumps that are timed to create surges within the water.

One of the main disadvantages of conventional saltwater circulation pumps is that the electric motors within them often become damaged because of the extreme power surges required to create the simulated wave motion. In addition, conventional saltwater circulation devices do not provide an even motion of water as found with natural waves.

Examples of water circulation devices include U.S. Pat. No. 5,732,657 to Idbeis; U.S. Pat. No. 3,452,966 to Smolski; U.S. Pat. No. 5,782,204 to Rahn; U.S. Pat. No. 4,152,263 to Goldman et al. which are all illustrative of such prior art.

Idbeis (U.S. Pat. No. 5,732,657) discloses an aquarium sea current generator. Idbeis teaches the use of two compartments within an aquarium with a constant flow air pump connected to a water chamber for pumping air in and expelling water out of an opening into the aquarium and then into the upper chamber.

Smolski (U.S. Pat. No. 3,452,966) discloses a liquid treatment apparatus. Smolski teaches the utilization of a helical baffle within a tube for moving water into a spiral and upward motion.

Rahn (U.S. Pat. No. 5,782,204) discloses a wave maker for living aquariums. Rahn teaches the use of a shuttle valve for directing pressurized water from a pump to one of two outlets thereby creating a desired wave motion.

While these devices may be suitable for the particular purpose to which they address, they are not as suitable for providing improved water circulation to a saltwater aquarium by simulating a natural wave motion. Conventional water circulation devices do not adequately create the desired water flows associated with natural wave movements which are desirable for the health of living organisms within a saltwater aquarium.

In these respects, the aquarium water circulation system according to the present invention substantially departs from the conventional concepts and designs of the prior art, and in so doing provides an apparatus primarily developed for the purpose of providing improved water circulation to a saltwater aquarium by simulating a natural wave motion.

SUMMARY OF THE INVENTION

In view of the foregoing disadvantages inherent in the known types of water circulation devices now present in the prior art, the present invention provides a new aquarium water circulation system construction wherein the same can be utilized for providing improved water circulation to a saltwater aquarium by simulating a natural wave motion.

The general purpose of the present invention, which will be described subsequently in greater detail, is to provide a new aquarium water circulation system that has many of the advantages of the water circulation devices mentioned heretofore and many novel features that result in a new aquarium water circulation system which is not anticipated, rendered obvious, suggested, or even implied by any of the prior art water circulation devices, either alone or in any combination thereof.

To attain this, the present invention generally comprises a container having an interior portion, a plurality of upper slots within said container, a plurality of lower slots within said container, a shaft having a first threading and a second threading, a plunger member threadably attached about said shaft and slidably positioned within said container, and a motor mechanically connected to said shaft for rotating said shaft. As the plunger member is forced downwardly, the water within the container is forced out from the lower slots and into the upper slots. When the plunger member is forced upwardly, the water within the container is forced out from the upper slots and into the lower slots simulating wave motions.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an aquarium water circulation system that will overcome the shortcomings of the prior art devices.

Another object is to provide an aquarium water circulation system that simulates a wave motion within a conventional aquarium.

An additional object is to provide an aquarium water circulation system that improves the water circulation within a saltwater aquarium.

A further object is to provide an aquarium water circulation system that increases the quality of life for living organisms within a saltwater aquarium.

Another object is to provide an aquarium water circulation system that has only a few moving components.

An additional object is to provide an aquarium water circulation system that has no electrical components beneath the water level of the aquarium.

A further object is to provide an aquarium water circulation system that extends the useful life of the electric motor.

An additional object is to provide an aquarium water circulation system that provides a constant alternating water current.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
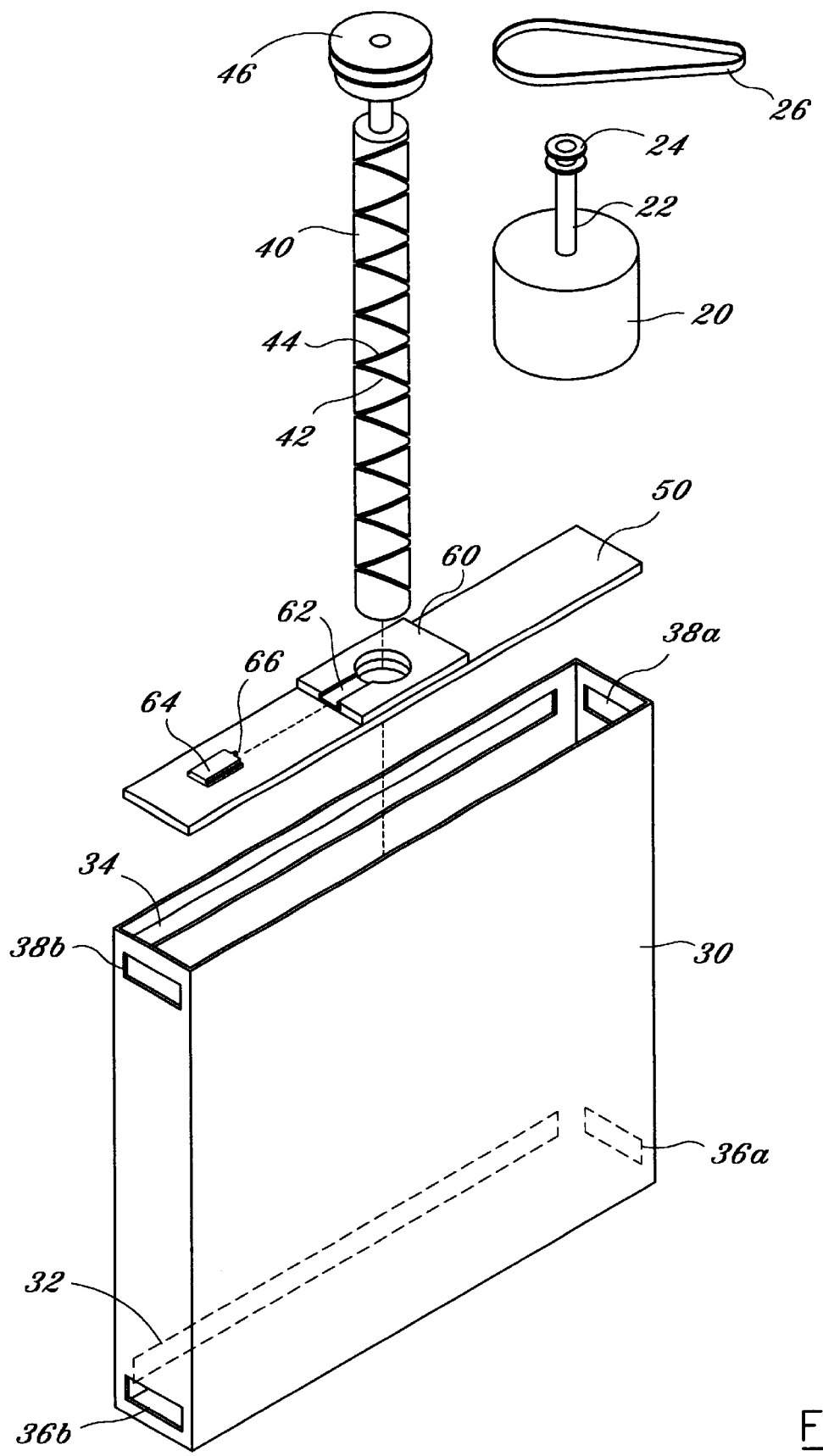
FIG. 1 is an exploded upper perspective view of the present invention.
Figure 2:
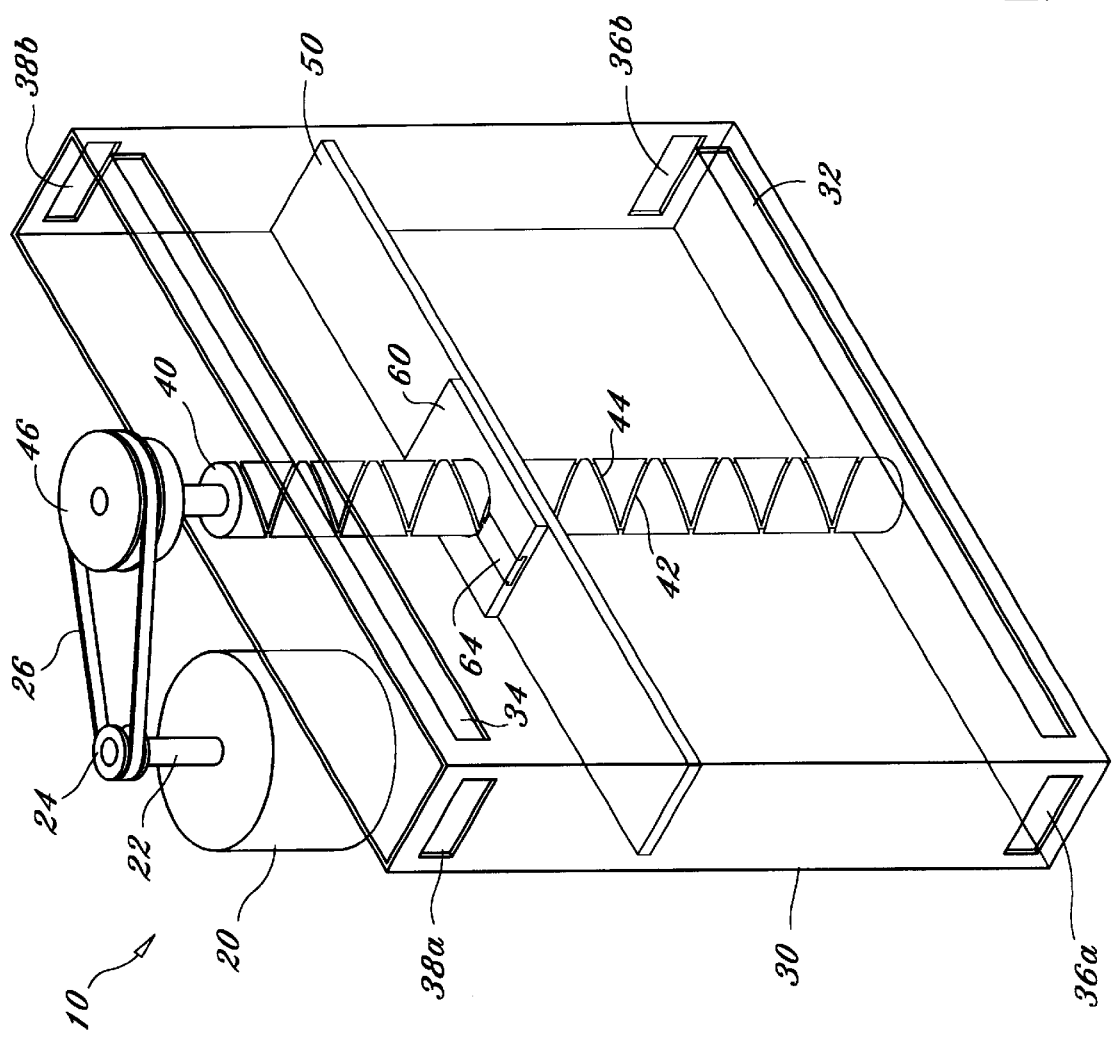
FIG. 2 is a front upper perspective view of the present invention.
Figure 3:
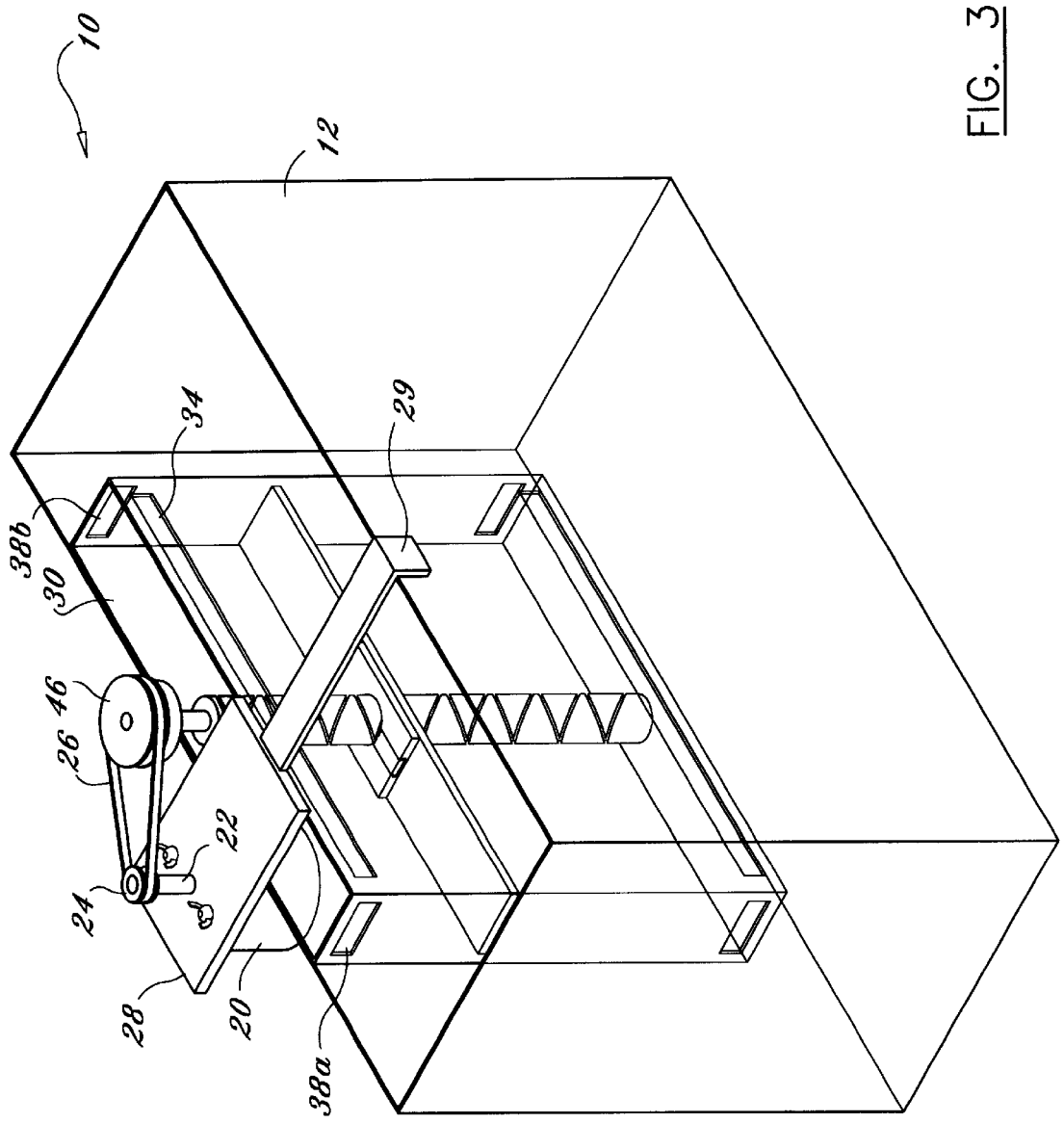
FIG. 3 is a rear upper perspective view of the present invention.

Turning now descriptively to the drawings, in which similar reference characters denote similar elements throughout the several view, FIGS. 1 through 6 illustrate an aquarium water circulation system 10, which comprises a container 30 having an interior portion, a plurality of upper slots within said container 30, a plurality of lower slots within said container 30, a shaft 40 having a first threading 42 and a second threading 44, a plunger member 50 threadably attached about said shaft 40 and slidably positioned within said container 30, and a motor 20 mechanically connected to said shaft 40 for rotating said shaft 40. As the plunger member 50 is forced downwardly, the water within the container 30 is forced out from the lower slots 32, 36a–b and into the upper slots 34, 38a–b. When the plunger member 50 is forced upwardly, the water within the container 30 is forced out from the upper slots 34, 38a–b and into the lower slots 32, 36a–b simulating wave motions.

As shown in FIGS. 1 through 6 of the drawings, the container 30 is an enclosed structure having at least one side wall. The container 30 is preferably a rectangular shape, however it can be appreciated by one skilled in the art that the container 30 can be various other shapes such as oval, circular or square. The container 30 may be constructed of any well-known material such as plastic. The container 30 is sized to fit comfortably within a conventional aquarium 12.

As shown in FIGS. 1 through 5 of the drawings, a lower front slot 32 extends into the lower portion of the container 30. The lower front slot 32 is preferably elongated and follows substantially along the front portion of the container 30.

As further shown in FIGS. 1 through 5, a pair of lower side openings 36a–b extend into the lower side portions of the container 30. The pair of lower side openings 36a–b are a shortened opening which are preferably parallel to the lower front slot 32.

As shown in FIGS. 1 through 5 of the drawings, a upper front slot 34 extends into the upper portion of the container 30. The upper front slot 34 is preferably elongated and follows substantially along the front portion of the container 30.

As further shown in FIGS. 1 through 5, a pair of upper side openings 38a–b extend into the upper side portions of the container 30. The pair of upper side openings 38a–b are a shortened opening which are preferably parallel to the upper front slot 34.

As shown in FIGS. 1 through 6 of the drawings, a shaft 40 is rotatably positioned within said container 30. The shaft 40 includes a first threading 42 and a second threading 44 that is opposite of the first threading 42. The lower portion and the upper portion of the threadings 42, 44 are connected for allowing the shaft 40 to be rotated in one direction yet still allowing the plunger member 50 to alternate moving upwardly and downwardly.

Figure 4:
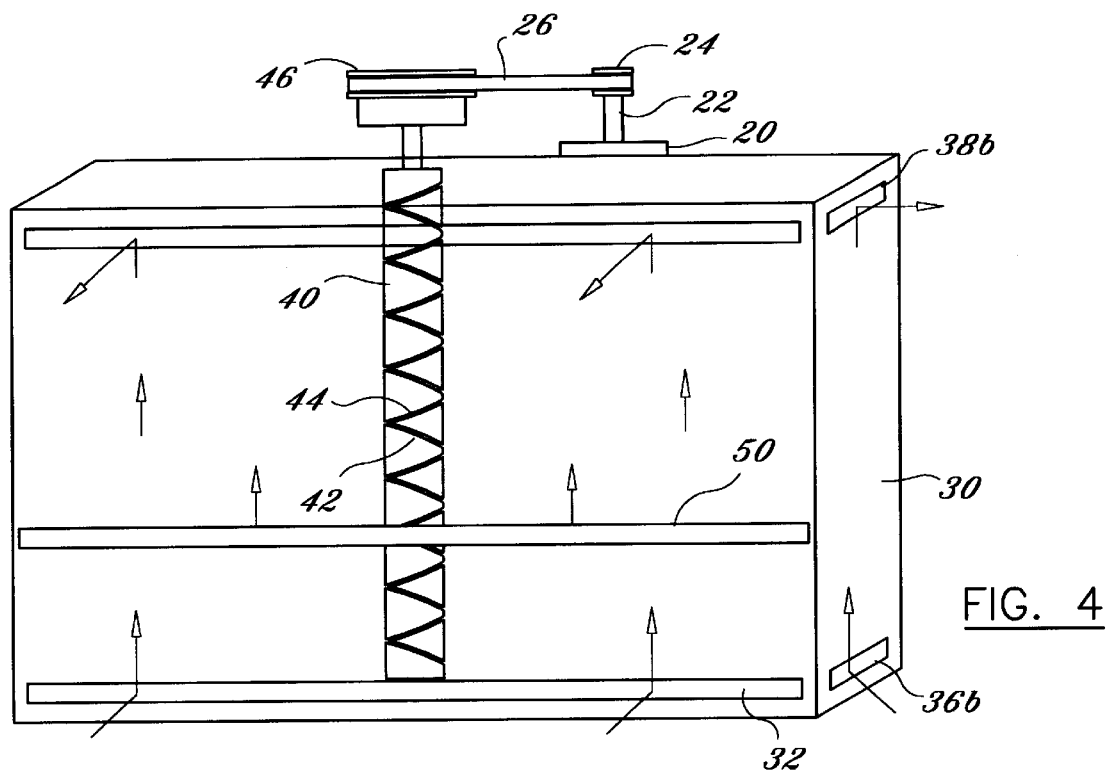
FIG. 4 is a front upper perspective view of the present invention with the plunger moving upwardly.
Figure 5:
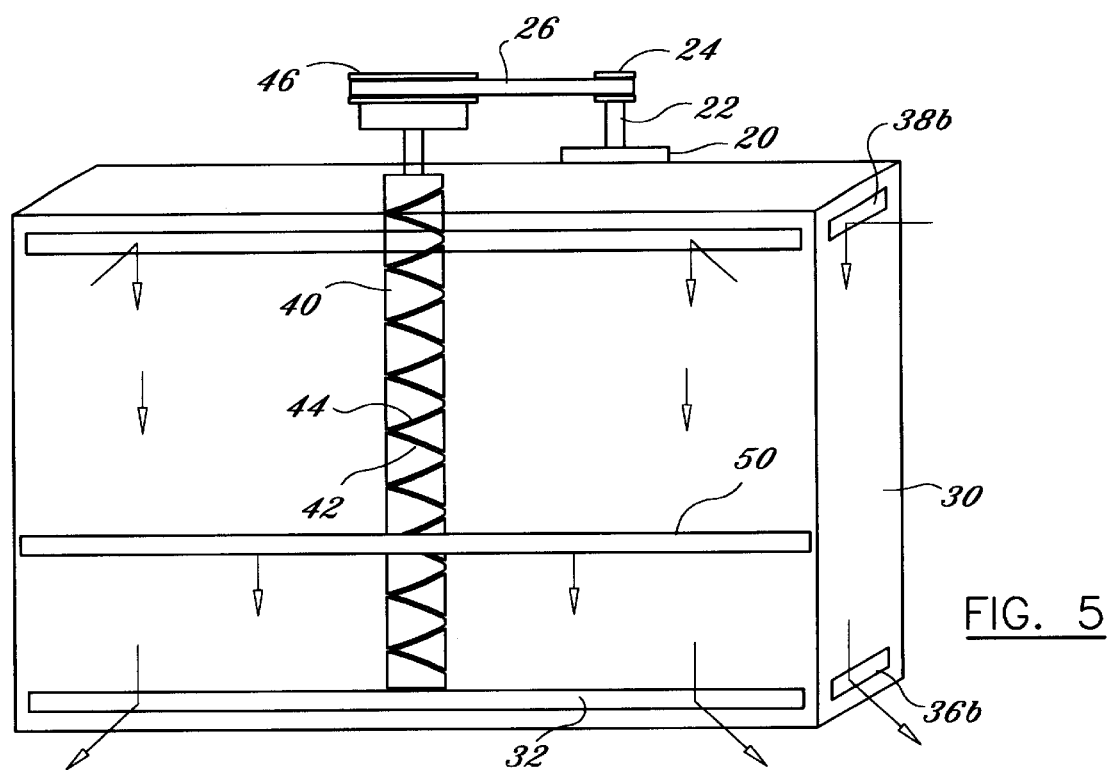
FIG. 5 is a front upper perspective view of the present invention with the plunger moving downwardly.
Figure 6:
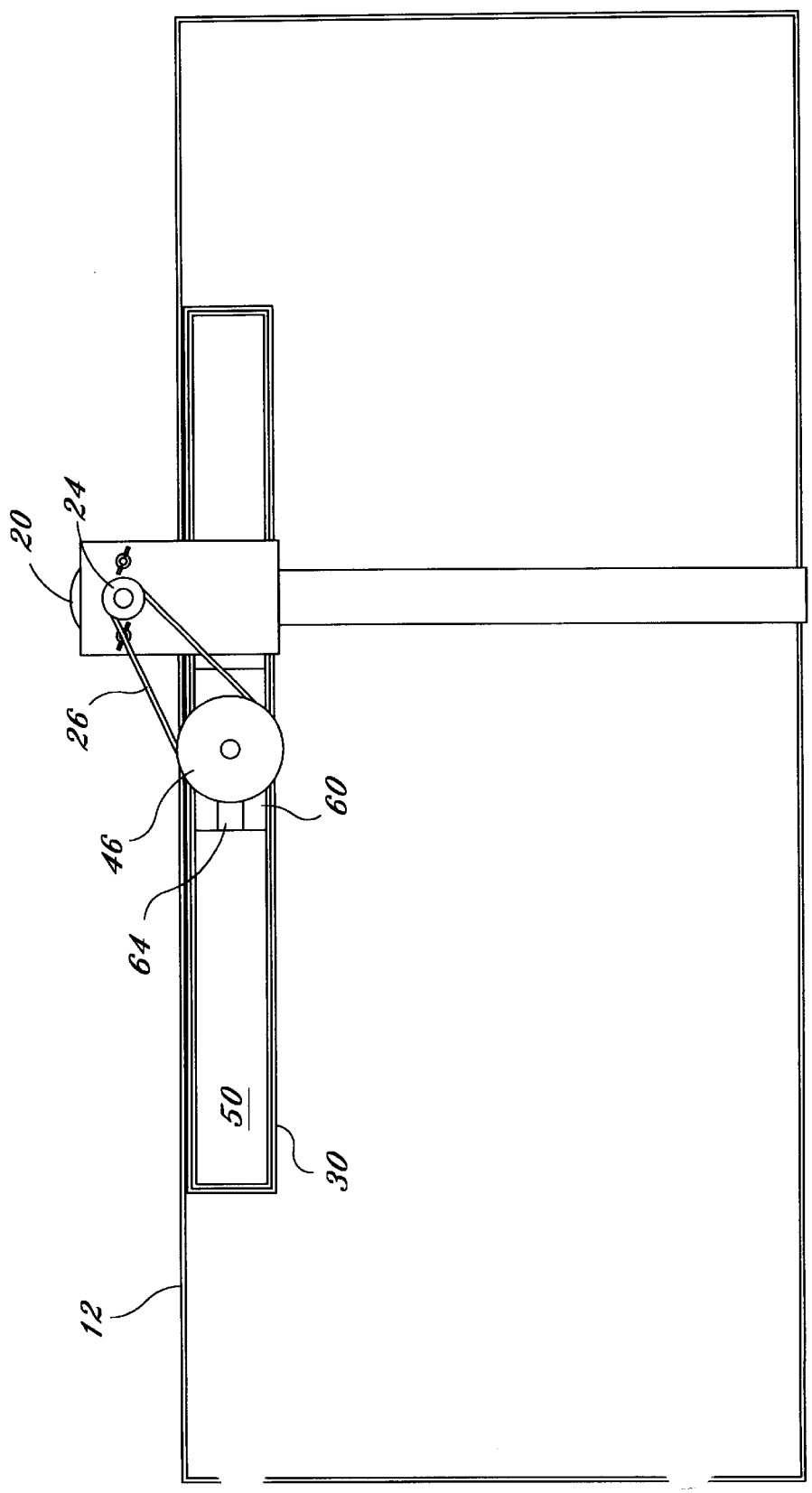
FIG. 6 is a top view of the present invention.

As shown in FIGS. 1 through 6 of the drawings, a bracket 28 is attached to the upper portion of the container 30 that secures a motor 20. A drive shaft 22 from the motor 20 extends through the bracket 28 and a drive pulley 24 is attached to the distal end of the drive shaft 22. An upper pulley 46 is attached to the upper end of the shaft 40 thereby allowing a belt 26 or chain to be mechanically connected between the upper pulley 46 and the drive pulley 24. A tongue 29 extends from the bracket 28 to the opposing side of the container 30 for providing additional support as best shown in FIG. 6 of the drawings.

As shown in FIGS. 1 through 6 of the drawings, a plunger member 50 is threadably positioned about the shaft 40. The plunger member 50 is formed to the interior shape of the container 30 for moving water within the container 30 outwardly through the lower slots 32, 36a–b and the upper slots 34, 38a–b.

As best shown in FIG. 1 of the drawings, a plate is attached to the upper surface of the plunger member 50 about the central aperture that is positionable about the shaft 40. A slot 62 within the plate receives a key member 64 having a nub 66 extending from the key member 64 for engaging the first threading 42 and the second threading 44.

In use, the container 30 is positioned within the interior of the aquarium 12 with the motor 20 positioned outside of the aquarium 12. The user operates a power switch which causes the motor 20 to rotate the drive shaft 22 thereby causing the shaft 40 to rotate. The nub 66 of the key member 64 threadably engages the first threading 42 thereby causing the plunger member 50 to move upwardly as shown in FIG. 4. As the plunger member 50 moves upwardly, water enters the lower slots 32, 36a–b and water exits the upper slots 34, 38a–b as shown in FIG. 4 of the drawings. As the plunger member 50 nears the upper end of the shaft 40, the nub 66 leaves the first threading 42 and enters the second threading 44 thereby causing the plunger member 50 to enter a downward motion as shown in FIG. 5 of the drawings. As the plunger moves downwardly, water exits the lower slots 32, 36a–b and water enters the upper slots 34, 38a–b as shown in FIG. 5 of the drawings causing a wave motion within the water of the aquarium 12. As the plunger member 50 nears the lower end of the shaft 40, the nub 66 leaves the second threading 44 and enters the first threading 42 thereby causing the plunger member 50 to enter an upward motion again. This process continues simulating actual wave motion within the aquarium 12 until the user terminates power to the motor 20.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An aquarium water circulation system, comprising:
   a container having an interior portion;
   at least one upper opening and at least one lower opening within said container;
   a plunger movably positioned within said interior portion of said container;
   a motor means mechanically connected to said plunger for moving said plunger upwardly and downwardly within said container thereby causing water flow through said at least one upper opening and said at least one lower opening, wherein said motor means moves said plunger upwardly and downwardly within said container in a continuous and alternating pattern; and
   a shaft rotatably positioned within said container, wherein said shaft is threadably engaged with said plunger and mechanically connected to said motor means.

2. The aquarium water circulation system of claim 1, wherein said shaft includes a first threading and a second threading, wherein said first threading and said second threading are connected at an upper end and a lower end of the shaft.

3. The aquarium water circulation system of claim 2, wherein said plunger includes:
   a plate attached to an upper surface of said plunger about an aperture within said plunger that slidably receives said shaft;
   a slot within said plate; and
   a key member having a nub slidably positionable within said slot, wherein said nub threadably engages said first threading and said second threading.

4. The aquarium water circulation system of claim 1, wherein said at least one lower opening comprises:
   a lower front slot; and
   a pair of lower side openings within opposing sides of said container.

5. The aquarium water circulation system of claim 1, wherein said at least one upper opening comprises:
   an upper front slot; and
   a pair of upper side openings within said opposing side of said container.

6. The aquarium water circulation system of claim 1, wherein said container is rectangular shaped.

7. An aquarium water circulation system, comprising:
   a container having an interior portion;
   at least one first opening and at least one second opening within said container;
   a shaft rotatably positioned within said container having at least one threading;
   a plunger movably positioned within said interior portion of said container and threadably engaged with said shaft; and
   a motor means mechanically connected to said shaft for moving said plunger upwardly and downwardly within said container thereby causing water flow through said at least one first opening and said at least one second opening, wherein said motor means moves said plunger upwardly and downwardly within said container in a continuous and alternating pattern.

8. The aquarium water circulation system of claim 7, wherein said shaft includes a first threading and a second threading, wherein said first threading and said second threading are connected at an upper end and a lower end of the shaft.

9. The aquarium water circulation system of claim 7, wherein said plunger includes:
   a plate attached to said plunger about an aperture within said plunger that slidably receives said shaft;
   a slot within said plate; and
   a key member having a nub slidably positionable within said slot, wherein said nub threadably engages said at least one threading of said shaft.

10. The aquarium water circulation system of claim 7, wherein said at least one second opening comprises a lower front slot, and at least one lower side opening.

11. The aquarium water circulation system of claim 7, wherein said at least one first opening comprises an upper front slot, and at least one upper side opening.

12. The aquarium water circulation system of claim 7, wherein said plunger has a shape similar to said interior portion of said container.

13. An aquarium water circulation system, comprising:
   a container having an interior portion;
   at least one first opening and at least one second opening within said container;
   a shaft rotatably positioned within said container having at least one threading;
   a plunger movably positioned within said interior portion of said container and threadably engaged with said shaft; and
   a motor mechanically connected to said shaft for rotating said shaft in a single direction thereby moving said plunger upwardly and downwardly in a continuous and alternating pattern upon said shaft within said container thereby causing water flow through said at least one first opening and said at least one second opening.

14. The aquarium water circulation system of claim 13, wherein said shaft includes a first threading and a second threading, wherein said first threading and said second threading are connected at an upper end and a lower end of the shaft.

15. The aquarium water circulation system of claim 13, wherein said plunger includes:
   a plate attached to said plunger about an aperture within said plunger that slidably receives said shaft;
   a slot within said plate; and
   a key member having a nub slidably positionable within said slot, wherein said nub threadably engages said at least one threading of said shaft.

16. The aquarium water circulation system of claim 13, wherein said at least one second opening comprises a lower front slot, and at least one lower side opening.

17. The aquarium water circulation system of claim 13, wherein said at least one first opening comprises an upper front slot, and at least one upper side opening.

18. The aquarium water circulation system of claim 13, wherein said plunger has a shape similar to said interior portion of said container.

* * * * *